(12) United States Patent
Zhao et al.

(10) Patent No.: US 12,099,650 B2
(45) Date of Patent: Sep. 24, 2024

(54) METHOD AND APPARATUS FOR IDENTIFYING GAZE BEHAVIOR IN THREE-DIMENSIONAL SPACE, AND STORAGE MEDIUM

(71) Applicant: KINGFAR INTERNATIONAL INC., Beijing (CN)

(72) Inventors: Qichao Zhao, Beijing (CN); Ran Yang, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 374 days.

(21) Appl. No.: 17/699,656

(22) Filed: Mar. 21, 2022

(65) Prior Publication Data
US 2022/0206575 A1    Jun. 30, 2022

Related U.S. Application Data

(63) Continuation of application No. PCT/CN2021/072883, filed on Jan. 20, 2021.

(30) Foreign Application Priority Data

Jan. 20, 2020  (CN) .......................... 202010065990.2

(51) Int. Cl.
*G06F 3/01*    (2006.01)
*G06T 7/20*    (2017.01)
*G06T 7/70*    (2017.01)

(52) U.S. Cl.
CPC ............... *G06F 3/013* (2013.01); *G06T 7/20* (2013.01); *G06T 7/70* (2017.01)

(58) Field of Classification Search
CPC .............. G06F 3/013; G06T 7/70; G06T 7/20
See application file for complete search history.

(56) References Cited

U.S. PATENT DOCUMENTS 11,334,154 B2 *   5/2022   Cohen ................... G02B 27/017
11,762,462 B2 *   9/2023   Cohen ................... G06F 3/0304
                                                                345/156
(Continued)

FOREIGN PATENT DOCUMENTS

CN    107656613 A    2/2018
CN    109271030 A    1/2019
(Continued)

OTHER PUBLICATIONS

International Search Report for PCT/CN2020/072883 dated Apr. 26, 2021, (4 pages).
(Continued)

*Primary Examiner* — Utpal D Shah
(74) *Attorney, Agent, or Firm* — Cooper Legal Group, LLC (57) ABSTRACT

Provided is a method for identifying a gaze behavior in a three-dimensional space, comprising: acquiring eye movement data of the two eyes of a user; selecting, from the collected eye movement data, eye movement data for gaze behavior identification; calculating eye movement angular velocities, determining gaze point data corresponding to the gaze behavior; combining pieces of gaze point data, which satisfy a time proximity condition and a space proximity condition at the same time, in the gaze point data so as to obtain a gaze duration and the 3D coordinates of gaze points; and based on the combined pieces of gaze point data, determining a gaze point at which the gaze duration is longer than a second set duration, thereby identifying the gaze behavior.

10 Claims, 2 Drawing Sheets

(56) References Cited

U.S. PATENT DOCUMENTS

| | | | |
|---|---|---|---|
| 11,857,378 B1* | 1/2024 | Bojarski | G02B 27/0176 |
| 2018/0032816 A1* | 2/2018 | Trapp | G06V 40/197 |
| 2018/0275410 A1 | 9/2018 | Yeoh et al. | |
| 2018/0364810 A1* | 12/2018 | Parshionikar | G06F 3/013 |
| 2019/0251701 A1 | 8/2019 | Shukla | |
| 2022/0066205 A1* | 3/2022 | Wiggeshoff | G06F 3/013 |
| 2022/0083134 A1* | 3/2022 | Kassner | G06F 3/013 |

FOREIGN PATENT DOCUMENTS

| | | | |
|---|---|---|---|
| CN | 109887000 A | 6/2019 | |
| CN | 110286754 A | 9/2019 | |
| CN | 111309144 A | 6/2020 | |

OTHER PUBLICATIONS

Jan Hendrick Hammer, et al.; "Real-time 3D gaze analysis in mobile applications"; Aug. 29, 2013; pp. 75-78.

European Patent Office; Communication Pursuant to Article 94(3) EPC; Related to EP Application No. 21745193.9; Aug. 21, 2023; 7 Pgs.

* cited by examiner

METHOD AND APPARATUS FOR IDENTIFYING GAZE BEHAVIOR IN THREE-DIMENSIONAL SPACE, AND STORAGE MEDIUM

The present application is a continuation of international PCT application No. PCT/CN2021/072883, filed on Jan. 20, 2021, which claims the priority benefit of China application No. 202010065990.2, filed on Jan. 20, 2020. The entirety of international PCT application No. PCT/CN2021/072883 and China application No. 202010065990.2 are incorporated herein by reference and made a part of this specification.

TECHNICAL FIELD

The present application belongs to the technical field of gaze direction identification and particularly relates to a method and apparatus for identifying a gaze behavior in a three-dimensional space and a memory medium.

BACKGROUND ART

Gazing is one of main behaviors and is also an important behavior of human vision. Humans obtain information of attributes, movements and the like of concerned things through gazing.

With development of a VR (Virtual Reality) technology and an AR (Augmented Reality) technology, there is an urgent need for solving the problem of the increasing demands on identification of gaze behaviors in whether a virtual three-dimensional space or a real three-dimensional space. In prior art, eye movements of the humans are recorded with eye trackers generally, and the gaze behaviors are identified according to acquired eye movement data. In the gaze behavior identification process, with points seen by taking human eyes as initial points and extending from the initial points in visual directions as eye movement points, limited to the working principle of a current eye tracker, eye movement data acquired by the eye tracker can only express the visual direction and cannot express gaze behavior information of a visual depth in the three-dimensional space.

SUMMARY

Aiming to the deficiencies in prior art, an objective of the present application is to provide a method and apparatus for identifying a gaze behavior in a three-dimensional space and a memory medium so as to overcome the defect that the prior art cannot determine a visual depth and be used for completing identification of the gaze behavior in the three-dimensional space.

The technical solution employed to solve the technical problems by the present application is as follows.

In one aspect, the present application provides a method for identifying a gaze behavior in a three-dimensional space, comprising:
acquiring eye movement data of two eyes of a user, wherein the eye movement data comprises: sampling time points, 3D coordinates of positions of the two eyes at the sampling time points in a three-dimensional space coordinate system and 3D coordinates of positions of eye movement points of the two eyes;
selecting eye movement data for identifying a gaze behavior from the acquired eye movement data;
calculating eye movement angular speeds at a plurality of sampling time points in the selected eye movement data, and determining gaze point data corresponding to a gaze behavior based on the calculated eye movement angular speeds and an eye movement angular speed threshold corresponding to the gaze behavior;
merging gaze point data that satisfies both of a temporal proximity condition and a spatial proximity condition in the gaze point data to obtain a gaze duration and 3D coordinates of a gaze point, wherein the temporal proximity condition is that an interval between the sampling time points is smaller than a first set duration, and the spatial proximity condition is that a visual light included angle between adjacent gaze points is smaller than a set angle and a distance between adjacent gaze points is smaller than a set distance; and
determining a gaze point with a gaze duration larger than a second set duration based on the merged gaze point data, and identifying the gaze behavior.

In some embodiments, the acquiring eye movement data of the two eyes of the user comprises:
establishing a three-dimensional space coordinate system;
performing a detection at an assigned sampling time point with an eye tracker to obtain a left eye 3D coordinate, a right eye 3D coordinate, left eye visual direction information and right eye visual direction information in the three-dimensional space coordinate system;
with the left eye 3D coordinate as an initial point, taking a coordinate of a first intersection at which a left eye visual direction intersects with an object in the three-dimensional space as a 3D coordinate of a left eye movement point; and
with the right eye 3D coordinate as an initial point, taking a coordinate of a first intersection at which a right eye visual direction intersects with an object in the three-dimensional space as a 3D coordinate of a right eye movement point.

In some embodiments, the selecting the eye movement data for identifying a gaze behavior from the acquired eye movement data comprises:
if a dominant eye is known, using eye movement data corresponding to the dominant eye as the eye movement data for identifying a gaze behavior; and
if a dominant eye is unknown, using a mean value of eye movement data of the left eye and the right eye as the eye movement data for identifying a gaze behavior.

In some embodiments, after acquiring the eye movement data of the two eyes of the user, the identification method further comprises: preprocessing the acquired eye movement data such that a same quantity of the eye movement data is included in a unit time and a sampling noise and outliers are eliminated.

In some embodiments, the calculating the eye movement angular speed at the plurality of sampling time points in the selected eye movement data comprises:
if a sample number n in a sampling window is even, dividing a visual light included angle between two eye movement points in the n/2th group of eye movement data before and after each sampling time point by a sampling interval time to obtain the eye movement angular speed; and
if the sample number n in a sampling window is odd, dividing the visual light included angle between the two eye movement points in the (n−1)/2th group of eye movement data before and after each sampling time point by the sampling interval time to obtain the eye movement angular speed.

In some embodiments, a calculation formula of the eye movement angular speed is $$\omega = \frac{\arccos\langle \vec{i_1}, \vec{i_2}\rangle}{\Delta t}$$

where $\Delta t$ represents the sampling interval time; $\vec{i_1}$ and $\vec{i_2}$ are direction vectors of the eyes pointing to two eye movement points respectively; $\arccos\langle \vec{i_1}, \vec{i_2}\rangle$ represents an included angle between two visual lights; and $\omega$ represents the eye movement angular speed.

In some embodiments, the visual light included angle between the adjacent gaze points is smaller than 0.5°; and a calculation formula of the set distance is $$L = \lambda \times \min(D_1, D_2) \times \tan\frac{\theta}{57.3} \approx \lambda \times \min(D_1, D_2) \cdot \frac{\theta}{57.3},$$

where L represents the set distance, $\lambda$ is an amplification coefficient, $\lambda$ takes a value from 1.0 to 1.3, $D_1$ and $D_2$ represent distances from the eyes to two temporal proximity gaze points respectively, and $\theta$ represents a visual light included angle between the adjacent gaze points.

In some embodiments, the eye movement angular speed threshold is 10-30°/s, the first set duration is 75 ms or less; and the second set duration is 100 ms.

In another aspect, the present application further provides an apparatus for identifying a gaze behavior in a three-dimensional space, comprising a memory, a processor, wherein the memory stores computer programs that are executable by the processor. When the processor executes the computer programs, the foregoing method are implemented.

In yet another aspect, the present application further provides a non-transitory computer readable storage medium with computer programs stored thereon; and when the computer programs are executed, the foregoing method are implemented.

For the method and apparatus for identifying the gaze behavior in the three-dimensional space and the memory medium of the present application, by using the eye tracker in combination with data of the three-dimensional space coordinate system, the eye movement data of the dominant eye in the three-dimensional space is accurately obtained, and the visual depth information is obtained. By setting three standards that the sampling time point interval is smaller than the first set duration, the visual light included angle between the gaze points is smaller than a set angle, and the distance between the gaze points is smaller than the set distance, aiming to two aspects of temporal proximity and spatial proximity, the gaze behavior in the three-dimensional space is determined in combination with a visual depth difference and is accurately identified.

BRIEF DESCRIPTION OF THE DRAWINGS

In order to more clearly describe the technical solutions of the embodiments of the present application or in the prior art, the accompanying drawings required to describe the embodiments or the prior art are briefly described below. Apparently, the accompanying drawings described below are only some embodiments of the present application. Those of ordinary skill in the art may further obtain other accompanying drawings based on these accompanying drawings without inventive effort. In the drawings.

DETAILED DESCRIPTION

To make the purpose, technical solutions, and advantages of the embodiments of the present application clearer, the embodiments of the present application are further described below in detail with reference to the accompanying drawings. The exemplary embodiments of the present application and the description herein are used to explain the present application but do not limit the present application.

In the prior art, identification of a gaze behavior is applied to many fields; particularly, during man-machine interaction, in the process of capturing and determining a use state of a user, the gaze behavior, as a main behavior, can be used for characterizing the directivity of a series of actions of the user so as to guide accurate feedback of equipment, promote the experience effect of use of the user or achieve some complex operation processes.

In recent years, a VR (Virtual Reality) technology and an AR (Augmented Reality) technology are hottest, wherein the VR technology is a computer simulation technology capable of creating and experiencing a virtual world and uses a computer to generate an interactive three-dimensional dynamic virtual scene, and a simulation system of an entity behavior of the VR technology enables the user to immerse into the environment; and the AR technology is a technology calculating a position and an angle of an image of a camera in real time and adding a corresponding image and is a novel technology of "seamlessly" integrating information of a real world to information of a virtual world, and an objective of this technology is to sleeve the virtual world on the real world on a screen for interaction.

A virtual three-dimensional space is generated in the VR technology and are increasingly studied, developed and practiced in the application process. The applicant and related killed artisans gradually discover that, in the VR technology, the demands on identification of the gaze behavior of human eyes are very high, lying in the operation demands of equipment and more showing as promotion in requirement of the equipment for the feedback effect of the user. Whereas the AR technology more requires to identify the gaze behavior of the human eyes in real time, with the demand degree higher than that of the VR technology.

However, in the prior art, identification of the gaze behavior of the human eyes is mainly to monitor movements of the human eyes through an eye tracker, obtain visual light directions of the human eyes and further determine whether an effective gaze behavior occurs or not based on determination on visual light dwell time. Such identification mode is limited to the working principle of a current eye tracker applied to a virtual reality environment, and eye movement data acquired by the eye tracker can only express the visual direction and cannot express gaze behavior information of a visual depth in the three-dimensional space.

With development of the VR technology, how to use the eye tracker to obtain depth eye movement data in the virtual three-dimensional space becomes a problem to be solved. By providing the identification method for the gaze behavior in the three-dimensional space, the present application achieves identification of the gaze behavior in the three-dimensional space, particularly identification of the gaze behavior in the three-dimensional space in a VR scene.

Figure 1:
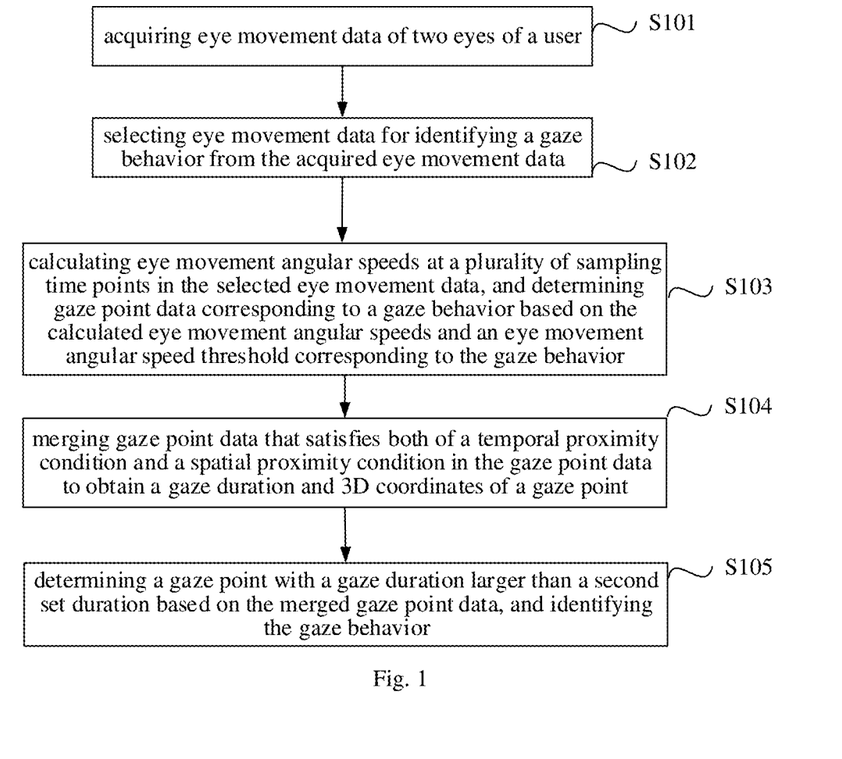
FIG. 1 is a flow chart of an identification method according to an embodiment of the present application.

As shown in FIG. 1, provided is the identification method for the gaze behavior in the three-dimensional space according to an embodiment of the present application, comprising the following steps:

step S101: acquiring eye movement data of two eyes of a user.

The eye movement data may include: sampling time points, 3D coordinates of positions of the two eyes at sampling time points in a three-dimensional space coordinate system and 3D coordinates of positions of eye movement points of the two eyes.

Aiming to gaze behavior identification in the three-dimensional space, the three-dimensional space may be divided into two kinds: one kind is a virtual three-dimensional space generated by equipment, for example, a three-dimensional stereotactic space generated by the VR technology; and aiming to such virtual three-dimensional space, a coordinate system used when the virtual three-dimensional space is generated may be directly employed as the three-dimensional space coordinate system for acquiring the eye movement data in this application, and the three-dimensional space coordinate system may further be established with a dominant eye or an eye tracker for detection as the center. The other kind of three-dimensional space is a reality three-dimensional space, for example, a three-dimensional space with the AR technology as a foundation; and aiming to such reality three-dimensional space, the three-dimensional space coordinate system may be established with the dominant eye or the eye tracker for detection as the center, and in certain specific cases, the three-dimensional space coordinate system may further be established with a point used for labeling in the reality three-dimensional space as the center. Specifically, for the reality three-dimensional space, corresponding coordinate acquiring may be performed in combination with a special distance measuring instrument or a distance measuring software.

Figure 2:
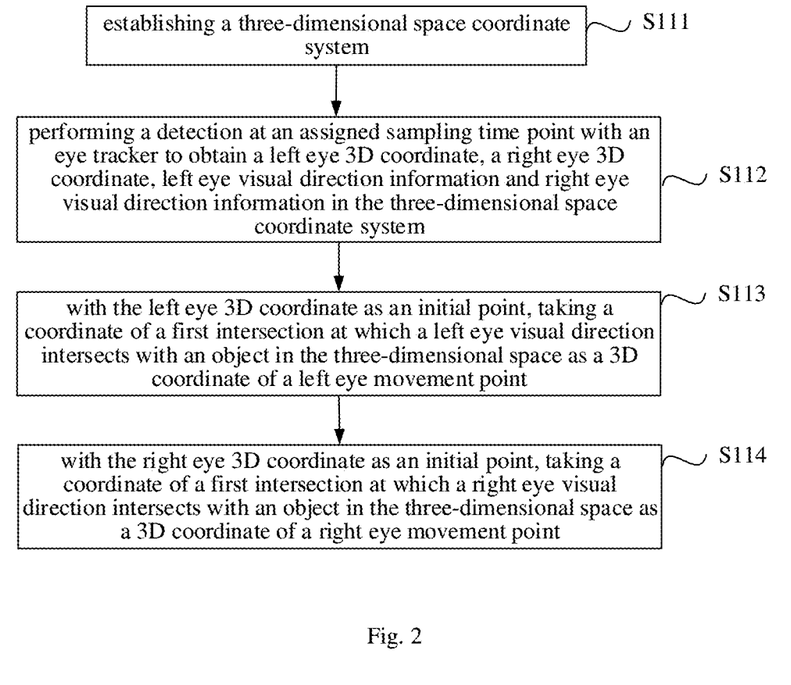
FIG. 2 is a flow chart of acquiring eye movement data of two eyes of a user in the identification method according to an embodiment of the present application.

In some embodiments, as shown in FIG. 2, with a VR application environment as an example, the step of acquiring eye movement data of the two eyes of the user may comprise:

step S111: establishing the three-dimensional space coordinate system. The three-dimensional space coordinate system is associated with data of a virtual reality space in the VR scene.

Step S112: performing a detection at an assigned sampling time point with the eye tracker to obtain a left eye 3D coordinate, a right eye 3D coordinate, left eye visual direction (such as, a visual angle) information and right eye visual direction (such as, the visual angle) information in the three-dimensional space coordinate system.

In the virtual three-dimensional space generated by the VR technology, as intact coordinate data of an object in the three-dimensional space is established, the coordinate data can be directly detected by the eye tracker and converted to the left eye 3D coordinate and/or the right eye 3D coordinate, a left eye visual direction and a right eye visual direction.

Further, a coordinate of a point that an extension line in a visual direction intersects with the object may obtained directly, i.e., a 3D coordinate of a left eye movement point and/or a 3D coordinate of a right eye movement point.

Step S113: making an extension line in a left eye visual direction with the left eye 3D coordinate as an initial point, and taking a coordinate of a first intersection at which the extension line intersects with an object in the virtual three-dimensional space in the VR scene as a 3D coordinate of the left eye movement point.

Step S114: making an extension line in a right eye visual direction with the right eye 3D coordinate as an initial point, and taking a coordinate of a first intersection at which the extension line intersects with an object in the virtual three-dimensional space in the VR scene as a 3D coordinate of the right eye movement point.

In addition, in the virtual three-dimensional space generated by the AR technology, by defining the three-dimensional space coordinate system, the coordinate data is detected by the eye tracker and may be converted to the left eye 3D coordinate and/or the right eye 3D coordinate, the left eye visual direction and the right eye visual direction. Extension lines are made in the left eye visual direction and the right eye visual direction, and intersections at which the extension lines intersect with the object in the reality three-dimensional space serve as the left eye movement point and the right eye movement point respectively. Further, by using the distance measuring instrument or the distance measuring software, a distance from the left eye movement point to the left eye and/or a distance from the right eye movement point to the right eye can be obtained, and a 3D coordinate of the left eye movement point and/or a 3D coordinate of the right eye movement point can be calculated in combination with a visual direction vector of the left eye and a visual direction vector of the right eye.

In addition, in the reality three-dimensional space, by establishing the three-dimensional space coordinate system and combining with the distance measuring instrument or the distance measuring software, a coordinate of an entity in the environment in the three-dimensional space coordinate system may be obtained; and then 3D coordinates of the eye movement points of the two eyes may be obtained based on 3D coordinates and visual direction information, obtained by the eye tracker, of the positions of the two eyes at a sampling time point in the three-dimensional space coordinate system.

Step S102: selecting eye movement data for identifying the gaze behavior from the acquired eye movement data, comprising:

if the dominant eye is known, using eye movement data corresponding to the dominant eye as the eye movement data for identifying the gaze behavior; and if the dominant eye is unknown, using a mean value of eye movement data of the left eye and the right eye as the eye movement data for identifying the gaze behavior.

In this embodiment, the dominant eye is also called a gazing eye or a master eye. Physiologically, an object seen by the dominant eye may be received by a brain in priority, and the dominant eye may be the left eye or the right eye. As the brain habitually uses imaging of the dominant eye to analyze and position the object, so that by employing the eye movement data of the dominant eye as main data for identifying the gaze point, the reality can be more accurately reflected, and the effect and the accuracy of identification are improved.

If the dominant eye is known, the eye movement data, corresponding to the dominant eye, of the left eye or the right eye is taken as the eye movement data for identifying the gaze behavior. If the dominant eye is unknown, the mean value of the eye movement data of the left eye and the right eye may be taken as the eye movement data for identifying the gaze behavior, wherein in the eye movement data for identifying the gaze behavior, a 3D coordinate of a human eye is the mean value of 3D coordinates of the left eye and the right eye, and a 3D coordinate of an eye movement point of the human eye is a mean value of the 3D coordinate of the left eye movement point and the 3D coordinate of the right eye movement point.

In this embodiment, in order to accurately reflect a gaze point generated in an actual vision, under the condition that the dominant eye is known, the eye movement data of the dominant eye is employed in priority for identification; and if the dominant eye is unknown, a deviation generated by the eye movement date of a non-dominant eye can be reduced in a mode of solving the mean value.

Exemplarily, when detection is performed at a ti sampling time point, the 3D coordinate of the left eye is (0,0,1), the 3D coordinate of the left eye movement point is (20,30,26), the 3D coordinate of the right eye is (0,6,1), and the 3D coordinate of the right eye movement point is (18,32,27). If the left eye or the right eye is known as the dominant eye, data of the corresponding eye is directly employed as the eye movement data of the dominant eye. If the dominant eye is unknown, the mean value (0,3,1) of the 3D coordinate of the left eye and the 3D coordinate of the right eye is taken as the 3D coordinate of the human eye in the identification data, the mean value (19,31,26.5) of the 3D coordinate of the left eye movement point and the 3D coordinate of the right eye movement point is taken as the 3D coordinate of the eye movement point of the eye movement data for identifying the gaze behavior, and the two mean values are recorded at the sampling time point ti at the same time.

In some embodiments, after acquiring the eye movement data of the left eye and the right eye, the identification method further comprises: preprocessing the eye movement data of the left eye and the right eye such that a quantity of the eye movement data included in unit time is the same and a sampling noise and outliers are eliminated.

In this embodiment, the eye movement data of the left eye and the right eye may be preprocessed in a mode of interpolation, smoothing operation and/or frequency correction. As these processing means are existing data processing means, the details will not be repeated herein.

Step S103: calculating eye movement angular speeds at a plurality of sampling time points in the selected eye movement data, and determining gaze point data corresponding to the gaze behavior, based on the calculated eye movement angular speeds and an eye movement angular speed threshold corresponding to the gaze behavior.

Specifically, when the eye movement angular speeds are smaller than the eye movement angular speed threshold, corresponding eye movement data may serve as gaze point data. According to definition of the eye movement angular speeds, angles of rotation of the human eyes in unit time are required to be detected for measurement of the eye movement angular speeds at the sampling time points. Exemplarily, a mean value of the eye movement angular speeds in a period of window time may be obtained by measuring a distance between rotation of eyeballs in certain time ranges before and after an assigned sampling time point at an interval; and the mean value is defined as the eye movement angular speed at the assigned sampling time point. In other embodiments, a maximum value, a minimum value, a median or the like of the eye movement angular speeds at various sampling time points in a period of window time may further be employed as the eye movement angular speed at the assigned sampling time point.

In order to further improve the accuracy, there is a need for reasonably selecting a sample number in a sampling window according to an interval time of the sampling time points; a range of the sampling window is controlled to be not too small, it needs to ensure that the sample number or range in the sampling window sufficiently reflects the characteristics of the eye movement angular speed at the assigned sampling time point; and a range of the sampling window is controlled to be not too large, the sample number or range in the sampling window needs to be controlled in a certain range to ensure to be representative.

Further, if the corresponding eye movement angular speed at the assigned sampling time point is smaller than the eye movement angular speed threshold, the corresponding dominant eye movement point at the assigned sampling time point is stored as the gaze point. Preferably, in some embodiments, the eye movement angular speed threshold is 10-30°/s, for example, aiming to some application scenes, the eye movement angular speed threshold may be set as 20°/s. If the corresponding eye movement angular speed at the assigned sampling time point is smaller than 20°/s, the eye movement point at the assigned sampling time point is classified as the gaze point, the corresponding 3D coordinate of the eye movement point at the assigned sampling time point is classified as the 3D coordinate of the dominant eye at the same time, and the corresponding 3D coordinate of the dominant eye and the sampling time point are recorded.

In some embodiments, the step of calculating the eye movement angular speed at the plurality of sampling time points in the selected eye movement data comprises:

if the sample number n in the sampling window is even, dividing the visual light included angle between two eye movement points in the n/2th group of eye movement data before and after each sampling time point by the sampling interval time to obtain the eye movement angular speed; and if the sample number n in a sampling window is odd, dividing the visual light included angle between two eye movement points in the (n−1)/2th group of eye movement data before and after each sampling time point by the sampling interval time to obtain the eye movement angular speed.

Exemplarily, when the interval time between two sampling time points is 20 ms, the sample number in a sampling window is selected as 10, the visual light included angle of 4° between the corresponding gaze points at the fifth sampling time points before and after the assigned sampling time point is divided by the interval time of 200 ms, and then the eye movement angular speed of 20°/s at the assigned sampling time point is obtained.

Specifically, in some embodiments, a calculation formula of the eye movement angular speed is as follows:

$$\omega = \frac{\arccos\langle \vec{l_1}, \vec{l_2} \rangle}{\Delta t}$$

where $\Delta t$ represents the sampling interval time; $\vec{l_1}$ and $\vec{l_2}$ are direction vectors of the eyes pointing to two eye movement points respectively; $\arccos\langle \vec{l_1}, \vec{l_2} \rangle$ represents an included angle between two visual lights; and $\omega$ represents the eye movement angular speed.

Step S104: merging gaze point data, and satisfying the temporal proximity condition and the spatial proximity condition at the same time, in the gaze point data to obtain a gaze duration and 3D coordinates of gaze points, wherein the temporal proximity condition is that an interval between the sampling time points is smaller than a first set duration, and the spatial proximity condition is that a visual light included angle between adjacent gaze points is smaller than a set angle, and a distance between adjacent gaze points is smaller than a set distance.

Specifically, the interval times of the gaze point data, satisfying temporal proximity and spatial proximity at the same time, are accumulated to obtain a gaze duration; and a mean value or a median of 3D coordinates of various eye movement points in the gaze point data, satisfying temporal proximity and spatial proximity at the same time, may serve as the 3D coordinate of the gaze point. In some embodiments, the 3D coordinate of the eye movement point at a center sampling time point may further serve as the 3D coordinate of the gaze point.

Occurrence of the gaze behavior refers to that the gaze point stays for a certain time within a certain range, which can express that the human eyes are gazing. In the prior art, detection on the gaze behavior in a two-dimensional space takes that visual directions of the human eyes stay for a set time within a certain range as a standard only, cannot meet the measurement requirement for a required visual depth during identification of the gaze behavior in the three-dimensional space by only taking the visual direction as the standard and cannot further obtain specific position information of the gaze points in the three-dimensional space at the same time. The inventor of this application makes a further improvement aiming to visual identification in the three-dimensional space based on the AR technology and the VR technology and aims at obtaining an effective gazing time and position information in the three-dimensional space.

In this embodiment, due to identification aiming to the gaze behavior in the three-dimensional space, in order to obtain effective gaze points and gazing time information, there is a need for merging associated gaze points at various sampling time points. Aiming to the gaze points in the three-dimensional space, two standards of the temporal proximity condition and the spatial proximity condition may be set, specifically as follows:

determining the temporal proximity condition may comprise: the interval between the sampling time points is smaller than the first set duration.

Figure 3:
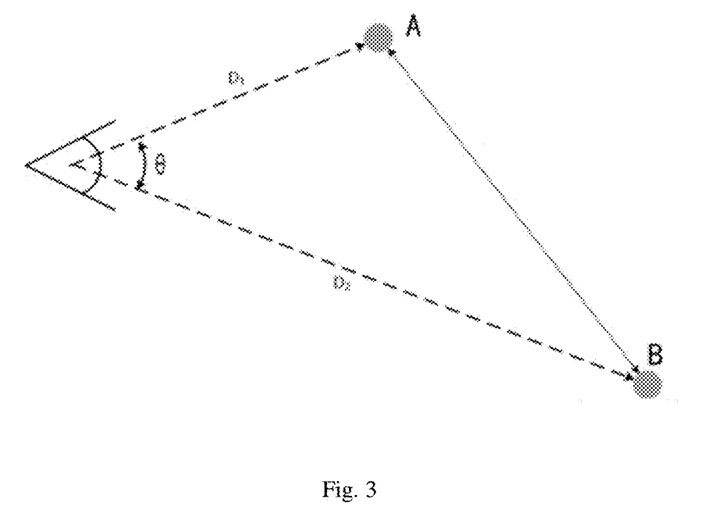
FIG. 3 is a schematic diagram of determining the spatial proximity condition in the identification method according to an embodiment of the present application.

Determining the spatial proximity condition may comprise:
1) the visual light included angle between adjacent gaze points is smaller than the set angle; and
2) the distance between adjacent gaze points is smaller than the set distance.

In order to ensure that the obtained gaze points are all continuous in both time and three-dimensional space position, there is a need for determining whether all the gaze points generated in the three-dimensional space meet the standards of temporal proximity and spatial proximity at the same time.

In this embodiment, in the aspect of temporal proximity condition, the gaze points with the interval between the sampling time points smaller than the first set duration are merged, preferably, the first set duration is 75 ms or less, for example, the gaze points at the interval between the sampling time points smaller than 75 ms may be merged. In other embodiments, the first set duration may further be set as other times smaller than 75 ms, for example, 60 ms, 50 ms and the like.

In the aspect of spatial proximity condition, in this embodiment, two determination parameters are defined, wherein one determination parameter is the visual light included angle between adjacent gaze points, and the other determination parameter is the distance between adjacent gaze points. Due to the three-dimensional space, the spatial proximity condition is expressed in relatively small visual light included angle and further requires the adjacent gaze points to keep close in visual depth at the same time.

In this embodiment, in the spatial proximity condition, the visual light included angle between the adjacent gaze points is set to be smaller than the set angle, and the distance between the gaze points is set to be smaller than the set distance at the same time; and preferably, the set angle, for example, is 0.5°, and the set distance is L.

Specifically, a calculation formula of the set distance L is as follows:

$$L = \lambda \times \min(D_1, D_2) \times \tan\frac{\theta}{57.3} \approx \lambda \times \min(D_1, D_2) \cdot \frac{\theta}{57.3}$$

where L represents the set distance, $\lambda$ is an amplification coefficient, $\lambda$ takes a value from 1.0 to 1.3, $D_1$ and $D_2$ represent distances from the eyes to two temporal proximity gaze points respectively, and $\theta$ represents the visual light included angle between the adjacent gaze points, in deg.

In the virtual reality application environment of the present application, a distance of the object and the distances of the eyes of an observer can be calculated. Data measured by the eye tracker is data with directions, that is, the data can indicate a gazing direction of the observer, so that the object, seen by the observer in this gazing direction in the virtual reality scene, in the virtual reality scene can be determined, and then the distances from the eyes of the observer to the object in virtual reality, i.e. D1 and D2, can be determined.

Exemplarily, as shown in FIG. 4, in the three-dimensional space, gaze points, corresponding to two close sampling time points, of the dominant eye are the point A and the point B, a visual light included angle is $\theta_1$, distances from the gaze points A and B to the dominant eye are D1 and D2 (D1<D2) respectively, a distance between A and B is D3, and then the set distance is as follows:

$$L = \lambda \times D1 \times \tan\frac{\theta_1}{57.3}.$$

If L is smaller than or equal to D3, and $\theta_1$ is smaller than 0.5°, that is, in the case of satisfying both the spatial proximity condition and the temporal proximity condition, the gaze points may be merged.

In an embodiment of the present application, merging of the gaze points may comprise: deleting a part of gaze points in the gaze points satisfying the spatial proximity condition and the temporal proximity condition, or taking a mean value of the gaze points to obtain a new gaze point, however, the present application is not limited to this.

Step S105: determining the gaze point with the gaze duration larger than the second set duration based on the merged gaze point data, and identifying the gaze behavior.

In this embodiment, in order to further output gazing information in the actual application process, there is a need for index definition on the durations of the merged gaze points in the step S1054. In this embodiment, the gaze points with the gaze duration reaching the second set duration are determined as occurrence of the gaze behavior, preferably, the second set duration is 100 ms. In other embodiments, the second set duration may further be set as other larger or smaller values according to specific application scenes.

That is, in this step, the durations of the merged gaze points are checked whether to be larger than or equal to 100 ms or not. If yes, the gaze points are kept as effective gaze points; or otherwise, the gaze points do not satisfy the duration condition and should be deleted.

From the above steps, in the method of the present application, by using the eye tracker in combination with data of the three-dimensional space coordinate system, the eye movement data of the dominant eye in the three-dimensional space is accurately obtained, and the visual depth information is obtained. By setting three standards that the sampling time point interval is smaller than the first set duration, the visual light included angle between the adjacent gaze points is smaller than a set angle, and the distance between the adjacent gaze points is smaller than the set distance, aiming to two aspects of temporal proximity and spatial proximity, the gaze behavior in the three-dimensional space is determined in combination with a visual depth difference and may accurately identified.

In other words, according to the technical solution of the present application, the problem that the eye movement data acquired by the eye tracker and applied to the virtual reality environment can express the visual directions only and cannot express the gaze behavior information of the visual depth in the three-dimensional space at present can be solved, so that the visual depth can be determined, and then the gaze points of the gaze behavior with the visual depth in the virtual reality scene can be accurately calculated.

Accordingly, the present application further provides an apparatus for identifying a gaze behavior in a three-dimensional space, comprising a memory, a processor and computer programs which are stored in the memory and may run on the processor. When the processor executes the computer programs, the steps of the above method may be implemented.

In addition, the present application further provides a computer readable storage medium, in which computer programs are stored; and when the programs are executed by the processor, the steps of the above method are implemented.

In the illustration of this description, the illustration of reference terms "one embodiment", "one specific embodiment", "some embodiments", "for example", "example", "specific example" or "some examples", etc. means that specific features, structures, materials or characteristics illustrated in combination with the embodiment or example are included in at least one embodiment or example of the present application. In this description, exemplary statements for the above terms do not must aim at the same embodiment or example. Moreover, the described specific features, structures, materials or characteristics can be combined appropriately in any one or more embodiments or examples. The sequence of steps involved in each embodiment is used to schematically illustrate the implementation of the present application, and the sequence of steps therein is not limited, and can be appropriately adjusted as required.

It will be appreciated by those skilled in the art that embodiments of the present application may be provided as a method, system, or computer program product. Accordingly, the present application may take the form of an entire hardware embodiment, an entire software embodiment, or an embodiment combining software and hardware aspects. Furthermore, the present application may take the form of a computer program product embodied on one or more computer-usable storage media (including, but not limited to, disk storage, CD-ROM, optical memory, etc.) having computer-usable program codes.

The present application is described with reference to flow charts and/or block diagrams of methods, apparatuses (systems), and computer program products according to embodiments of the present application. It will be understood that each flow and/or block in the flow chart and/or block diagrams, and combinations of flows and/or blocks in the flow charts and/or block diagrams, can be implemented by computer program instructions. These computer program instructions may be provided to the processor of a general purpose computer, special purpose computer, embedded processor or other programmable data processing device to produce a machine so that the instructions executed by the processor of the computer or other programmable data processing device produce a device for implementing the functions specified in one or more flows of a flow chart and/or one or more blocks of a block diagram.

These computer program instructions may also be stored in a computer-readable memory capable of directing a computer or other programmable data processing devices to work in a particular manner, so that the instructions stored in the computer-readable memory produce a manufacture article comprising instruction devices which are used for implementing the functions specified in one or more flows of a flow chart and/or one or more blocks of a block diagram.

These computer program instructions can also be loaded on a computer or other programmable data processing devices so that a series of operational steps are performed on the computer or other programmable devices to produce computer-implemented processing, such that the instructions executed on the computer or other programmable devices provide steps for implementing the functions specified in one or more flows of a flow chart and/or one or more blocks of a block diagram.

The specific embodiments described above further describe the purpose, technical solutions and beneficial effects of the present application in detail. It should be understood that the above only describes specific embodiments of the present application, and not intended to limit the protection scope of the present application. Any modification, equivalent replacement, improvement, etc. made within the spirit and principle of the present application shall be included within the protection scope of the present application.

What is claimed is:

1. A method for identifying a gaze behavior in a three-dimensional (3D) space, comprising:

acquiring eye movement data of two eyes of a user, wherein the acquired eye movement data comprises: sampling time points, 3D coordinates of positions of the two eyes at the sampling time points in a 3D space coordinate system, and 3D coordinates of positions of eye movement points of the two eyes;

selecting eye movement data for identifying a gaze behavior from the acquired eye movement data, and calculating eye movement angular speeds at a plurality of sampling time points in the selected eye movement data;

determining gaze point data corresponding to the gaze behavior based on the calculated eye movement angular speeds and an eye movement angular speed threshold corresponding to the gaze behavior;

merging gaze point data that satisfies both of a temporal proximity condition and a spatial proximity condition in the gaze point data to obtain a gaze duration and 3D coordinates of a gaze point, wherein the temporal proximity condition is that an interval between the sampling time points is smaller than a first set duration, and the spatial proximity condition is that a visual light included angle between adjacent gaze points is smaller than a set angle and a distance between the adjacent gaze points is smaller than a set distance; and determining a gaze point with a gaze duration larger than a second set duration based on the merged gaze point data, and identifying the gaze behavior.

2. The identification method according to claim 1, wherein the acquiring eye movement data of the two eyes of the user comprises:

establishing the 3D space coordinate system;

performing a detection at an assigned sampling time point with an eye tracker to obtain a left eye 3D coordinate, a right eye 3D coordinate, left eye visual direction information, and right eye visual direction information in the 3D space coordinate system;

with the left eye 3D coordinate as an initial point, taking a coordinate of a first intersection at which a left eye visual direction intersects with an object in the 3D space as a 3D coordinate of a left eye movement point; and with the right eye 3D coordinate as an initial point, taking a coordinate of a first intersection at which a right eye visual direction intersects with the object in the 3D space as a 3D coordinate of a right eye movement point.

3. The identification method according to claim 1, wherein the selecting the eye movement data for identifying the gaze behavior from the acquired eye movement data comprises:

when a dominant eye is known, using eye movement data corresponding to the dominant eye as the acquired eye movement data for identifying the gaze behavior; and when the dominant eye is unknown, using a mean value of eye movement data of a left eye and a right eye as the acquired eye movement data for identifying the gaze behavior.

4. The identification method according to claim 1, wherein after acquiring the eye movement data of the two eyes of the user, the identification method further comprises: preprocessing the acquired eye movement data such that a same quantity of the eye movement data is included in a unit time and a sampling noise and outliers are eliminated.

5. The identification method according to claim 1, wherein the calculating the eye movement angular speeds at the plurality of sampling time points in the selected eye movement data comprises:

when a sample number n in a sampling window is even, dividing the visual light included angle between two eye movement points in an n/2th group of eye movement data before and after each sampling time point by a sampling interval time to obtain the eye movement angular speed; and when the sample number n in the sampling window is odd, dividing the visual light included angle between the two eye movement points in an (n−1)/2th group of eye movement data before and after each sampling time point by the sampling interval time to obtain the eye movement angular speed.

6. The identification method according to claim 5, wherein a calculation formula of the eye movement angular speed is $$\omega = \frac{\arccos\langle \vec{l_1}, \vec{l_2}\rangle}{\Delta t}$$

where $\Delta t$ represents the sampling interval time; $\vec{l_1}$ and $\vec{l_2}$ are direction vectors of the two eyes pointing to two eye movement points respectively; $\arccos\langle \vec{l_1}, \vec{l_2}\rangle$ represents an included angle between two visual lights; and $\omega$ represents the eye movement angular speed.

7. The identification method according to claim 6, wherein the visual light included angle between the adjacent gaze points is smaller than 0.5°; the distance between the adjacent gaze points is smaller than the set distance; and a calculation formula of the set distance is $L = \lambda \times \min$ $$(D_1, D_2) \times \tan\frac{\theta}{57.3} \approx \lambda \times \min(D_1, D_2) \cdot \frac{\theta}{57.3},$$

where L represents the set distance, $\lambda$ is an amplification coefficient, $\lambda$ takes a value from 1.0 to 1.3, $D_1$ and $D_2$ represent distances from the two eyes to two temporal proximity gaze points respectively, and $\theta$ represents the visual light included angle between the adjacent gaze points.

8. The identification method according to claim 1, wherein the eye movement angular speed threshold is 10-30°/s; the first set duration is 75 ms or less; and the second set duration is 100 ms.

9. An apparatus for identifying a gaze behavior in a three-dimensional space, comprising a memory and a processor, wherein the memory stores computer programs that are executable by the processor, and the processor executes the computer programs to implement the method of claim 1.

10. A non-transitory computer readable storage medium with computer programs stored thereon, wherein the computer programs are executed to implement the method of claim 1.

* * * * *